United States Patent
Berry

(10) Patent No.: US 7,168,394 B2
(45) Date of Patent: Jan. 30, 2007

(54) SLIPCOVER FOR DOG COLLARS

(76) Inventor: Whitney H. Berry, P.O. Box 1886, Daphne, AL (US) 36526

( * ) Notice: Subject to any disclaimer, the term of this patent is extended or adjusted under 35 U.S.C. 154(b) by 46 days.

(21) Appl. No.: 11/013,442

(22) Filed: Dec. 17, 2004

(65) Prior Publication Data
US 2005/0132981 A1    Jun. 23, 2005

Related U.S. Application Data

(60) Provisional application No. 60/530,976, filed on Dec. 22, 2003.

(51) Int. Cl.
*A01K 27/00* (2006.01)
(52) U.S. Cl. ...................... 119/863; 119/792
(58) Field of Classification Search ............... 119/858, 119/792, 859, 863; 362/108
See application file for complete search history.

(56) References Cited

U.S. PATENT DOCUMENTS

| | | | |
|---|---|---|---|
| 4,141,322 A | 2/1979 | Evans | |
| 4,266,511 A | 5/1981 | Muench | |
| 4,407,233 A | 10/1983 | Bozzacco | |
| 5,044,322 A * | 9/1991 | Cohen et al. ............... 119/863 | |
| 5,109,803 A | 5/1992 | Dunham et al. | |
| D337,133 S | 7/1993 | Olsen et al. | |
| 5,535,106 A * | 7/1996 | Tangen ....................... 362/108 |
| 5,575,044 A * | 11/1996 | Zornes ......................... 24/168 |
| 5,878,698 A | 3/1999 | Lyell | |
| 6,070,556 A * | 6/2000 | Edwards ..................... 119/792 |
| 6,325,024 B1 | 12/2001 | Masukawa | |
| 2002/0117121 A1 | 8/2002 | Sporn | |
| 2002/0181104 A1* | 12/2002 | Gonzales ..................... 359/517 |
| 2003/0074720 A1* | 4/2003 | Reed ............................. 2/322 |

FOREIGN PATENT DOCUMENTS

WO    WO 97/06672    2/1997

* cited by examiner

*Primary Examiner*—Teri Pham Luu
*Assistant Examiner*—Elizabeth Shaw
(74) *Attorney, Agent, or Firm*—Litman Law

(57) ABSTRACT

The slipcover for dog collars is a fabric sleeve designed to slide onto the collar, covering the entire collar except the metal bracket and tongue of the buckle. A strip of fabric, slightly narrower than the sleeve and with an elastic loop at the end, is attached to and extends from the open end of the slipcover. The strip fits through the buckle and has a thin slot medially aligned for the tongue of the buckle to pass through. The loop at the end of the strip attaches to a button near the base of the strip on the open end of the slipcover, on the inner side. A plurality of openings are medially aligned near the closed end of the sleeve. The collar is fastened onto the dog's neck in the ordinary fashion, passing the tongue through any of the openings near the closed end of the slipcover.

10 Claims, 4 Drawing Sheets

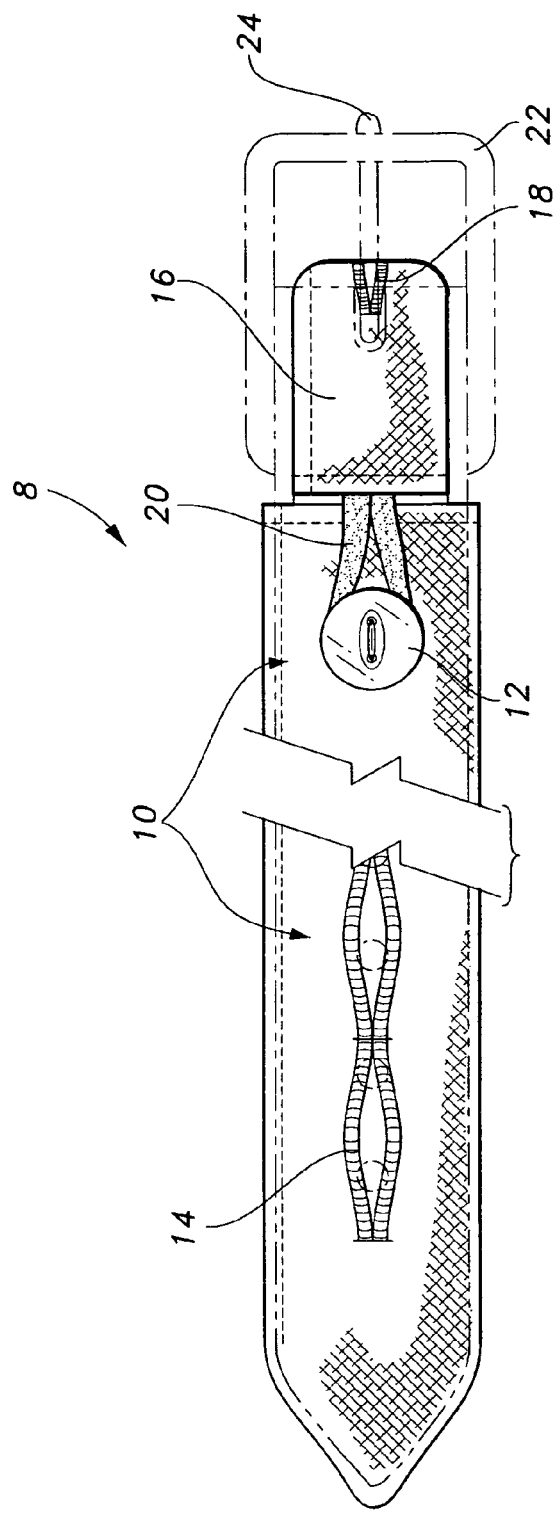
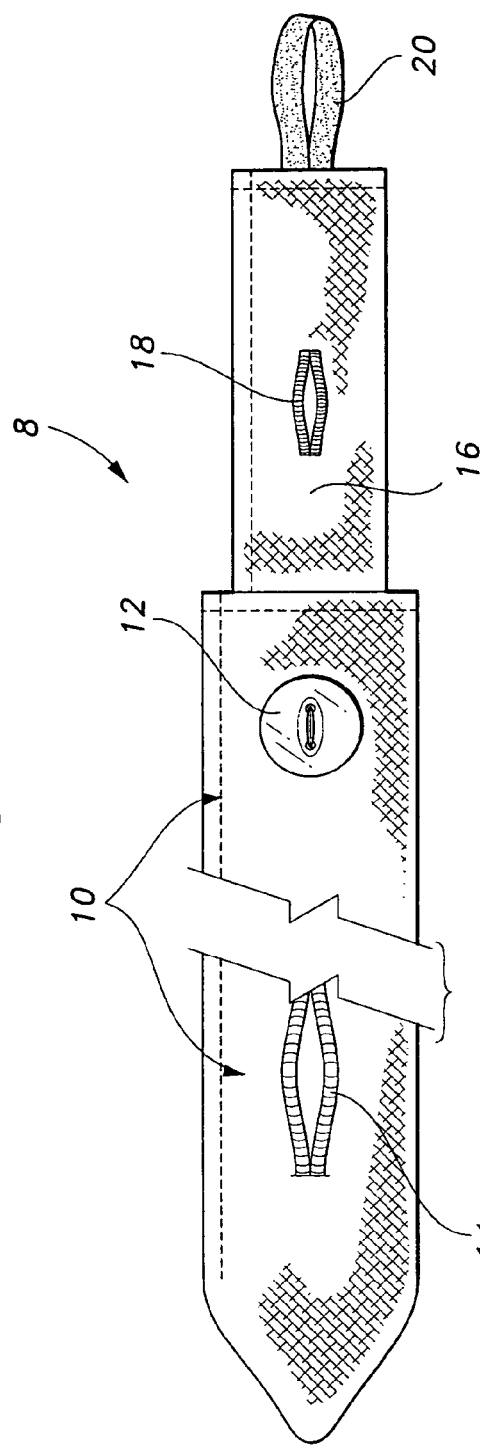
Fig. 4
Fig. 5

SLIPCOVER FOR DOG COLLARS

CROSS-REFERENCE TO RELATED APPLICATION

This application claims the benefit of U.S. Provisional Patent Application Ser. No. 60/530,976, filed Dec. 22, 2003.

BACKGROUND OF THE INVENTION

1. Field of the Invention

The present invention relates to ornamental pet apparel, and particularly to a slipcover for dog collars for the purpose of decorating the collar with a fabric cover that slides onto and off the collar for easy installation and removal. The slipcover covers the entire collar, except for the buckle, and may be furnished in a variety of ornamental designs.

2. Description of the Related Art

There is widespread fondness for personal pets, particularly for one of the most commonly owned household pets, the dog. Some pet owners adorn their beloved pets in decorative apparel, such as booties, bow ties, and dog-coats. A stylish dog's attire, with the dog's appearance, with the owner's clothing and appearance, or that simply provides a more decorative look than traditional leather dog collars would constitute a useful addition to the dog owner's options for adorning his or her valued companion.

However, to be of value a cover for a dog collar should be stably attached to the collar so that the desired placement is maintained through the dog's everyday activities. There is a need for a collar cover that may be used to decorate a dog collar, that may be used with different sized collars and different sized animal necks, that can be worn by the dog without needing constant adjustment during the course of the day, and that does not detract from the aesthetic value of the cover. While there are some collar covers addressing one or two of these issues, none address them all. Some do not cover the collar as completely as possible for maximum ornamental effect. Others serve an additional functional purpose, which inadvertently detracts from the aesthetic value of the cover. Still others are not adequately fixed to the dog collar, resulting in unintended shifting, twisting or bunching.

U.S. Pat. No. 5,878,698, issued Mar. 9, 1999 to J. Lyell, describes a collar cover comprising an elongated rectangular section of pliable material folded over and attached longitudinally to form a cylindrical sleeve, preferably attached by a continuous hook and loop fastener strip along the opposing sides of the rectangular material. An ornamental figure is attached to the outside of the cylindrical sleeve by a hook and loop fastener. The collar is passed through the cylindrical sleeve and the buckle is exposed through the ends and attached in the normal fashion to secure the collar and cylindrical cover.

Similarly, U.S. Pat. No. 5,109,803, issued May 5, 1992 to Dunham et al., describes a padded sleeve comprised of an elongated rectangular member, which folds over and attaches to form a cylindrical member. The cylindrical member has inner pockets that may be used for holding pet pesticides or deodorizing materials. The cylindrical member is folded over the collar, leaving the buckle exposed to fasten in the normal fashion to attach the collar and the sleeve to the pet.

U.S. Pat. No. 4,266,511, issued May 12, 1981 to H. Muench, describes a fabric cover comprising a strip of fabric with loops attached to its inner side for receiving the collar. The ends have ribbons or ties which may be tied together in a bow, or a knot entwined in or in front of the collar's buckle to secure the cover.

U.S. Pat. No. 4,141,322, issued Feb. 27, 1979 to M. Evans, describes a protective strip to be placed between an insecticidal collar and the animal's skin to prevent contact between the insecticide and the skin. As it is designed to protect the animal's skin from the inside, the protective strip does not cover the outside of the collar. Most of the collar is visible, except for the portions covered by the loops that attach the protective strip to the collar.

U.S. Pat. No. 4,407,233, issued Oct. 4, 1983 to E. Bozzacco, describes an elongated set of attachments constructed of highly reflective material. Each attachment is of such a length as to be easily visible, serving as a safety collar to alert automobiles to the presence of the animal, particularly at night. The collar is visible through the links of the reflective attachments. The collar buckles in the normal fashion to secure the both collar and the reflective attachments to the dog.

U.S. Patent Publication No. 2002/0117121, published on Aug. 29, 2002, describes a pet collar with a silk sleeve exterior. The sleeve is attached directly to an inner liner, which serves as the collar. The preferred method of attaching the sleeve disclosed is by stitching.

Other patents showing different types of covers for dog collars include U.S. Pat. No. 6,325,024, issued Dec. 4, 2001 to C. Masukawa (decorative collar with an attachment resembling a shirt collar); and International Patent Number WO 97/06672, published Feb. 27, 1997 (fabric tube designed to be fit around dog chain).

None of the above inventions and patents, taken either singly or in combination, is seen to describe the instant invention as claimed. Thus a slipcover for dog collars solving the aforementioned problems is desired.

SUMMARY OF THE INVENTION

The slipcover for dog collars is a fabric sleeve designed to slide onto the collar, covering the entire collar except the metal bracket and tongue of the buckle. A strip of fabric, slightly narrower than the sleeve and with a loop at the end, is attached to and extends from the open end of the slipcover. The strip fits through the buckle and has a thin slot medially aligned for the tongue of the buckle to pass through. The loop at the end of the strip attaches to a button near the base of the strip on the inner side of the open end of the slipcover. Alternatively, the loop may attach to the slipcover by any type of fastener, such as snaps or hook and loop fastening material.

There are a plurality of openings medially aligned near the closed end. The collar is fastened onto the dog's neck in the ordinary fashion, passing the tongue through any of the openings near the closed end of the slipcover. The openings may be slots, eyelets or grommets.

The slipcover totally covers the collar and appears to be, in fact, a natural designer collar instead of merely a cover for the collar. Also, whereas cylindrical covers have a tendency to twist and rotate around the collar, causing the intended outer design to be hidden from sight, the shape of the slipcover of the present invention prevents it from sliding around the collar, keeping the design properly aligned. Additionally, the slipcover's independent securing means prevents the slipcover from sliding up or down the collar. Moreover, the slipcover can be used as a decorative collar, but is still sturdy enough to be used while walking the dog.

Accordingly, it is a principal object of the invention to provide a cover for dog collars that covers the collar as completely as possible in order to cause the cover-collar combination to appear to be as natural as possible.

It is another object of the invention to, provide pet owners with an easily removable and washable cover for their pet's collar that can fit collars of varying length and may be worn by dogs of different sizes.

It is a further object of the invention to provide a cover that will not twist around the collar or bunch up at either end of the collar during the ordinary course of the day.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 4 is an elevation view of a slipcover for dog collars according to the present invention, with a dog collar, shown in phantom, being secured in the slipcover.

FIG. 5 is an elevation view of a slipcover for dog collars according to the present invention.

Similar reference characters denote corresponding features consistently throughout the attached drawings.

DETAILED DESCRIPTION OF THE PREFERRED EMBODIMENTS

Figure 2:
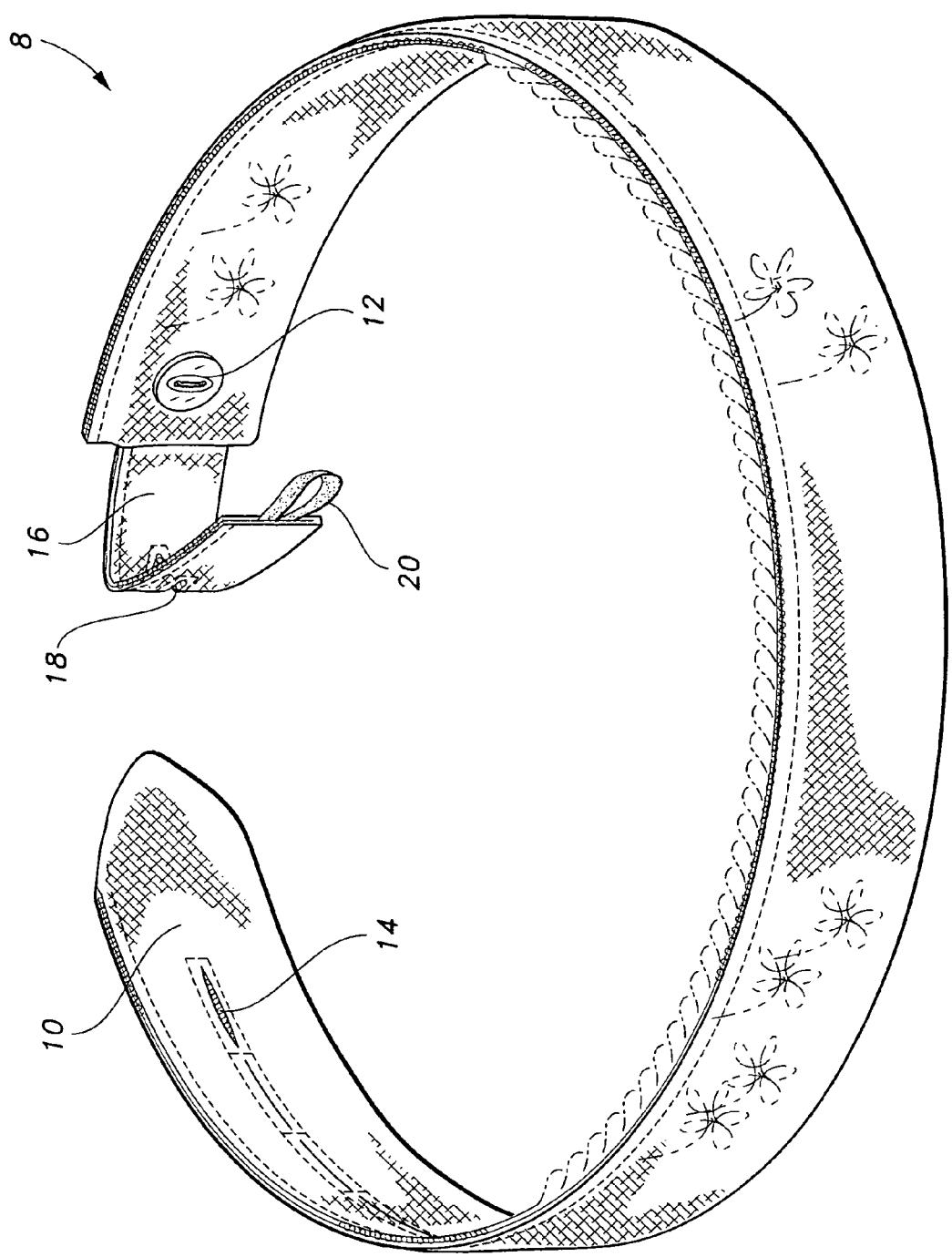
FIG. 2 is a perspective view of a slipcover for dog collars according to the present invention as seen from the rear.

The present invention is a slipcover for dog collars, designated generally as 8 in the drawings. Referring first to FIG. 2, the slipcover includes a fabric sleeve 10, having a button 12 near the open end and series of slots or openings 14 near the opposite, closed end. The closed end of the sleeve 10 may be tapered, conforming to the conventional tapered end of the dog collar strap. Alternatively, the closed end of the sleeve 10 can be square-shaped or rounded to accommodate any shaped tip of the collar. The sleeve bears an artistic design, a color pattern, a reflective strip, reflective stones or other like material, real or imitation jewels, bells, or any other similar ornamental design material. A fabric strip 16 is attached to and extends from the open end of the fabric sleeve 10. The fabric strip 16 has a thin slit 18 medially aligned therein. The fabric strip 16 also has a loop 20 attached to the end of the fabric strip 16 opposite the end that is attached to the fabric sleeve 10. The loop 20 may be formed from elastic material. The precise design of the loop 20 is not critical. Instead of the button 12 and loop 20, any type of attachment member may be used to hold the fabric strip 16 in a folded-loop to the inner side of the sleeve 10, such as corresponding snaps, hook and loop fastening material, or other types of fasteners.

Figure 1:
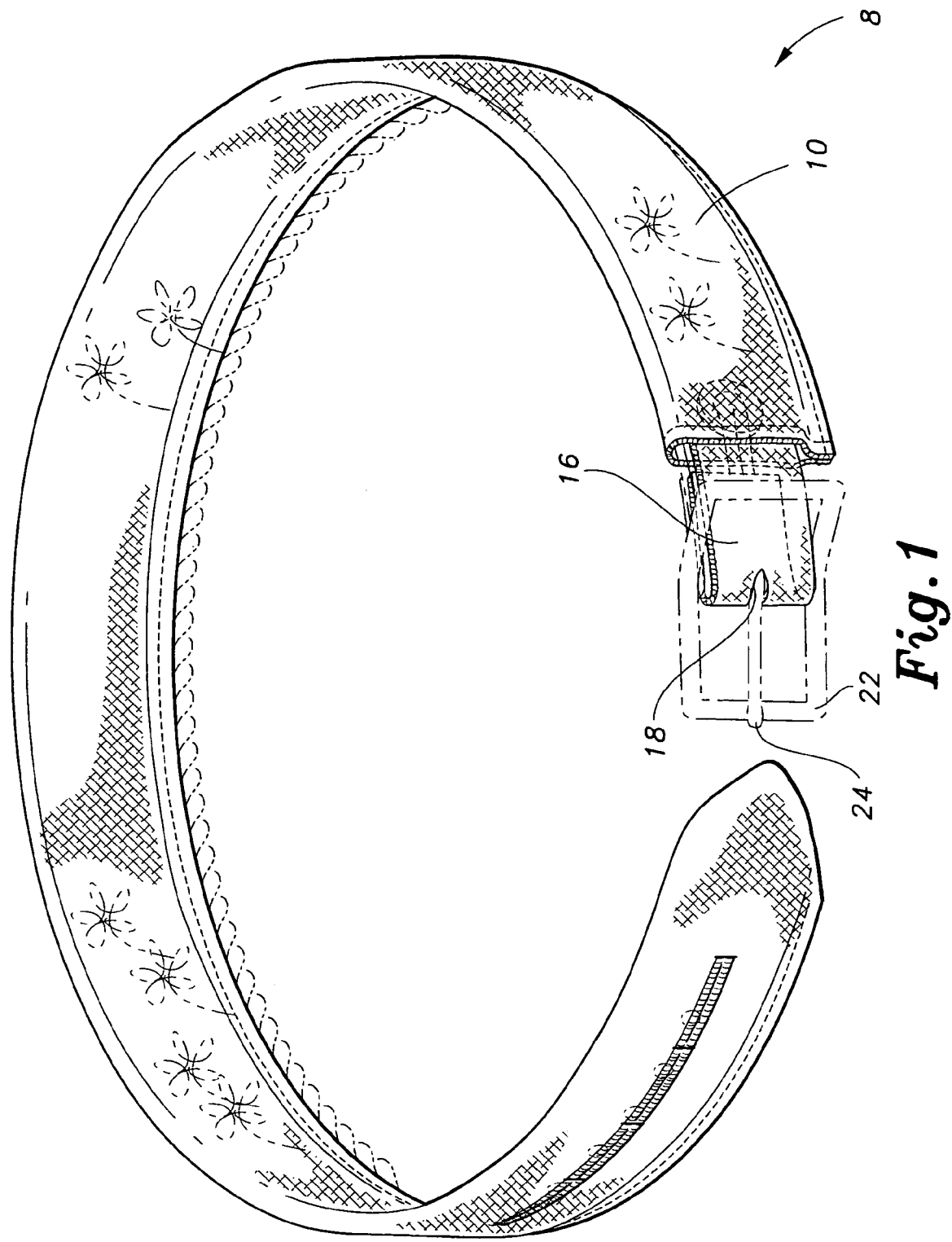
FIG. 1 is an environmental, perspective view of a slipcover for dog collars according to the present invention as seen from the front, a collar being disposed inside the slipcover.

As shown in FIG. 1, the collar is inserted into the sleeve 10. As shown in FIG. 4, in use the fabric strip 16 is then inserted through the dog collar buckle 22. The fabric strip 16 is folded down to bring the loop 20 to the button 12. The tongue 24 of the buckle 22 is passed through the slit 18 in the middle of the fabric strip 16. The loop 20 is attached to the button 12, thereby securing the slipcover 8 to the collar so that the slipcover 8 is prevented from sliding axially on the collar, from bunching up, or from rotating around the collar. FIG. 5 shows the button 12, fabric strip 16, and loop 20 open and with no dog collar inserted into the slipcover 8.

Figure 3:
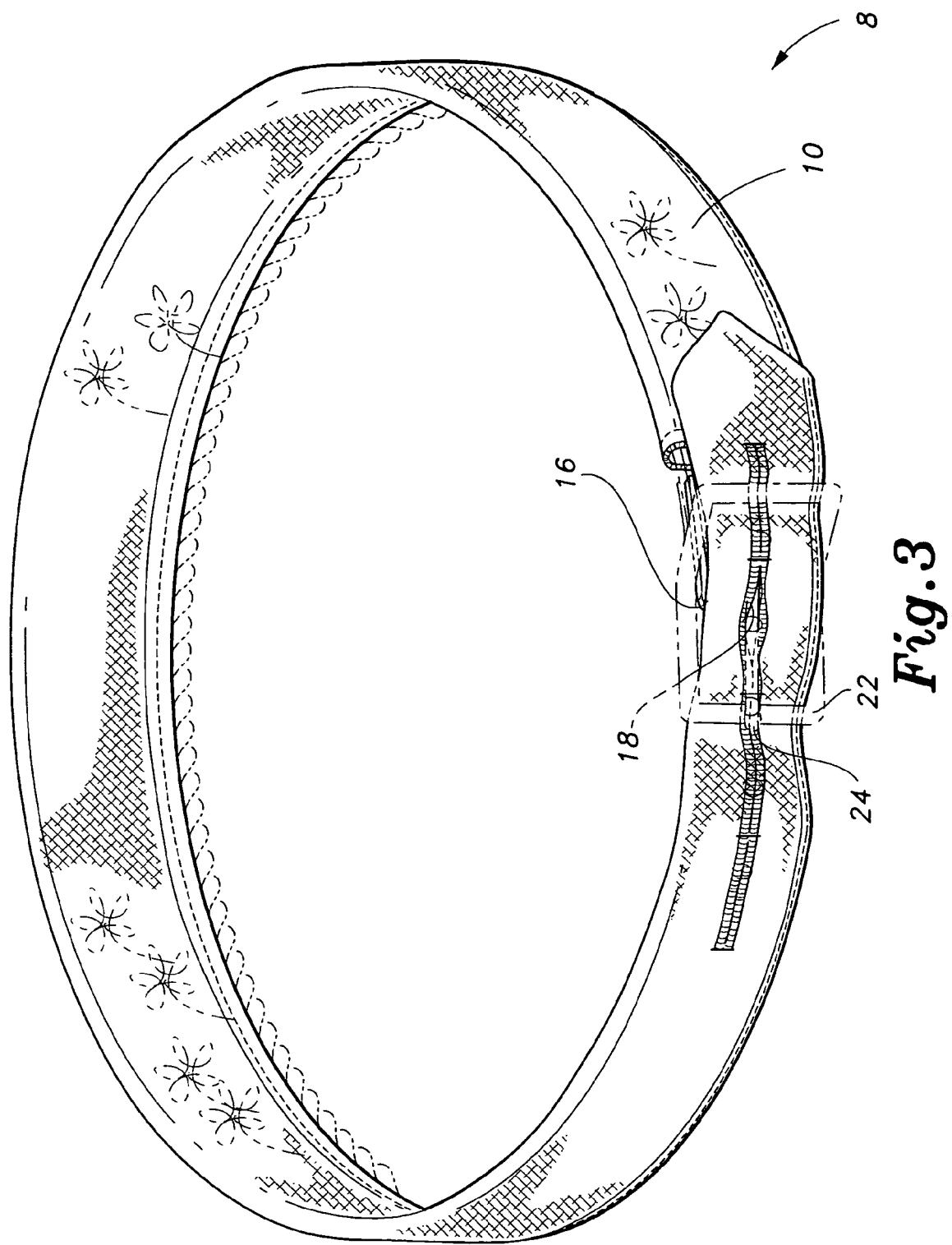
FIG. 3 is a perspective view of a slipcover for dog collars according to the present invention as seen from the front, a collar being shown in phantom disposed inside of the slipcover and buckled.

As shown in FIG. 3, in use the slipcover 8 is wrapped around the dog's neck and fastened using the buckle in the normal fashion, passing the buckle tongue 24 through one of the openings 14, which is aligned with a hole in the dog collar strap. The openings 14 are medially aligned near the closed end of the sleeve 10. The openings 14 may take any form that is adapted for receiving the tongue 24 of the buckle 22, such as slots, eyelets or grommets.

Although the slipcover 8 is shown with a loop 20 and button 12 securing the strip 16 around the buckle 22, it will be understood by those skilled in the art that other fastener means may be used to secure the free end of the strip 20 to the inside surface of the sleeve 10, such as a button and buttonhole, snap fastener, hook and loop fastener, etc.

It is to be understood that the present invention is not limited to the embodiment described above, but encompasses any and all embodiments within the scope of the following claims.

I claim:

1. A slipcover for dog collars, comprising:
   (a) an elongated fabric sleeve having an open end, an opposing closed end, an inner surface and an ornamental outer surface, the sleeve further having a plurality of spaced apart openings defined therein adjacent the closed end, the sleeve being adapted for covering and containing a dog collar, a buckle of the dog collar extending from the open end of the sleeve;
   (b) a fabric strip attached to the sleeve and extending from the open end, the strip being narrower that the sleeve and adapted for extending through the buckle of the dog collar, the strip having a slit defined therein adapted for receiving a tongue of the buckle and having a free end; and
   (c) fastening means for fastening the free end of the strip to the inner surface of the sleeve, the strip being wrapped through the buckle and over the tongue of the buckle.

2. The slipcover of claim 1, wherein the fastening means comprises a button attached to said sleeve and a corresponding loop extending from said strip.

3. The slipcover of claim 1, wherein the fastening means comprises mating patches of hook and loop fastening material attached to said sleeve and said strip.

4. The slipcover of claim 1, wherein the fastening means comprises a mating snap fasteners attached to said sleeve and said strip, respectively.

5. The slipcover of claim 1, wherein the openings are slots.

6. The slipcover of claim 1, wherein the openings are comprise eyelets.

7. The slipcover of claim 1, wherein the openings comprise grommets.

8. The slipcover of claim 1, wherein the ornamental outer surface includes reflective material.

9. The slipcover of claim 8, wherein the reflective material comprises reflective strips.

10. The slipcover of claim 8, wherein the reflective material comprises reflective stones.

* * * * *